US012795193B2

(12) United States Patent
Anderson et al.

(10) Patent No.: US 12,795,193 B2
(45) Date of Patent: Nov. 10, 2026

(54) EFFICIENT INJECTION OF INFORMATION OVERLAYS INTO VIDEO STREAMS USING IOT

(71) Applicant: Mimo Display LLC, Libertyville, IL (US)

(72) Inventors: David W Anderson, Libertyville, IL (US); Tom Doddridge, Chicago, IL (US); Patrick Hajduk, Palos Park, IL (US)

(73) Assignee: Mimo Display LLC, Libertyville, IL (US)

( * ) Notice: Subject to any disclaimer, the term of this patent is extended or adjusted under 35 U.S.C. 154(b) by 0 days.

(21) Appl. No.: 19/302,699

(22) Filed: Aug. 18, 2025

(65) Prior Publication Data

US 2026/0059166 A1 Feb. 26, 2026

Related U.S. Application Data

(60) Provisional application No. 63/685,778, filed on Aug. 22, 2024.

(51) Int. Cl.
*H04N 21/431* (2011.01)
*H04N 21/4363* (2011.01)
*H04N 21/443* (2011.01)

(52) U.S. Cl.
CPC ... *H04N 21/4316* (2013.01); *H04N 21/43635* (2013.01); *H04N 21/4436* (2013.01)

(58) Field of Classification Search
None
See application file for complete search history.

(56) References Cited

U.S. PATENT DOCUMENTS 10,091,438 B1 * 10/2018 Ho ............................ H04L 9/40
2019/0028758 A1 * 1/2019 Talvensaari ............ G06Q 30/00

* cited by examiner

*Primary Examiner* — James R Marandi
(74) *Attorney, Agent, or Firm* — McDonnell Boehnen Hulbert & Berghoff LLP

(57) ABSTRACT

Systems and methods are provided for extremely low-power, low-cost, and minimal-configuration injection of announcement overlays into high-resolution, high-frame rate, or otherwise high-bitrate video streams. These embodiments include transmitting representations of characters or other visual primitives to the memory of a specialized video processor that is optimized to overlay, in a restricted manner and with low power requirements and low complexity, visual overlays consisting of the stored visual primitives onto high-bitrate video streams. A coprocessor can communicate with an announcement server or other source of announcements and, upon receiving such an announcement, transmit to the video processor a representation thereof, in terms of the visual primitives stored in the video processor, in order to cause the video processor to overlay the announcement on the video stream.

20 Claims, 2 Drawing Sheets

EFFICIENT INJECTION OF INFORMATION OVERLAYS INTO VIDEO STREAMS USING IOT

CROSS-REFERENCE TO RELATED APPLICATION

This application claims priority to U.S. Provisional Patent Application No. 63/685,778 filed on Aug. 22, 2024, the contents of which are hereby incorporated by reference in their entirety.

BACKGROUND

Video streams (e.g., HDMI video streams) represent frames of video data and can be transmitted between sources (e.g., between video sources like computers, video game console, cable boxes, or other sources of video data) and sinks (e.g., televisions, monitors, digital video recorders, or other receivers of video data) and/or between other types of devices (e.g., video switches, signal regenerators, wireless transmitters). Such video streams can be provided at a variety of temporal and spatial resolutions (e.g., standard definition, 4K, 60 Hz, 120 Hz) and/or may include additional formatting or other data (e.g., 3D data, content protection information, audio streams, remote control or other system commands). Such video streams can be generated or modified, however, for higher resolution, higher frame rate, or otherwise higher bit-rate video streams, such generation or modification can implicate significant computational costs (e.g., processor cycles, memory, interconnect bandwidth), and corresponding energy and systems complexity costs.

SUMMARY

In a first aspect, a method is provided that includes: (i) receiving, by a video stream processor via a first video interface of the video stream processor, an indication of a video input stream, wherein the video stream processor additionally comprises a second video interface, a first communication interface, and an internal memory; wherein the video stream processor has stores in the internal memory thereof representations of a plurality of visual objects; (ii) receiving, via a network interface of a controller, an indication of an announcement; (iii) responsive to receiving the indication of the announcement, transmitting, to the first communication interface via a second communication interface of the controller, an indication of an overlay to apply to the video input stream, wherein the indication of the overlay includes an indication of a plurality of locations within the video input stream and respective identities of visual objects stored in the internal memory to overlay on the video input stream; (iv) generating, by the video stream processor overlaying onto the video input stream at the respective locations the respective identified visual objects, a video output stream; and (v) transmitting, via the second video interface, an indication of the video output stream.

In another aspect, a non-transitory computer readable medium is provided having stored thereon program instructions executable by at least one processor to cause the at least one processor to perform any of the above methods.

In another aspect a system is provided that includes: (i) at least one processor; and (ii) a non-transitory computer-readable medium, having stored therein instructions executable by the at least one processor to cause the system to perform any of the above methods.

In another aspect, a system is provided that includes: (i) a video input connector; (ii) a video output connector; (iii) a video stream processor that includes a first video interface, a second video interface, a first communication interface, and an internal memory, wherein the video stream processor is configured to store representations of a plurality of visual objects in the internal memory; and (iv) a controller comprising one or more processors, wherein the controller includes a second communication interface and a network interface. The video stream processor is configured to: (a) receive, via the first video interface, an indication of a video input stream that is input into the system via the video input connector; (b) receive, via the first communication interface, an indication of an overlay to apply to the video input stream, wherein the indication of the overlay includes an indication of a plurality of locations within the video input stream and respective identities of visual objects stored in the internal memory to overlay on the video input stream; (c) generate, by overlaying onto the video input stream at the respective locations the respective identified visual objects, a video output stream; and (d) transmit, via the second video interface, an indication of the video output stream from the system via the video output connector. The controller is configured to: (a) receive, via the network interface, an indication of an announcement; and (b) responsive to receiving the indication of the announcement, transmit, to the first communication interface via the second communication interface, the indication of the overlay.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
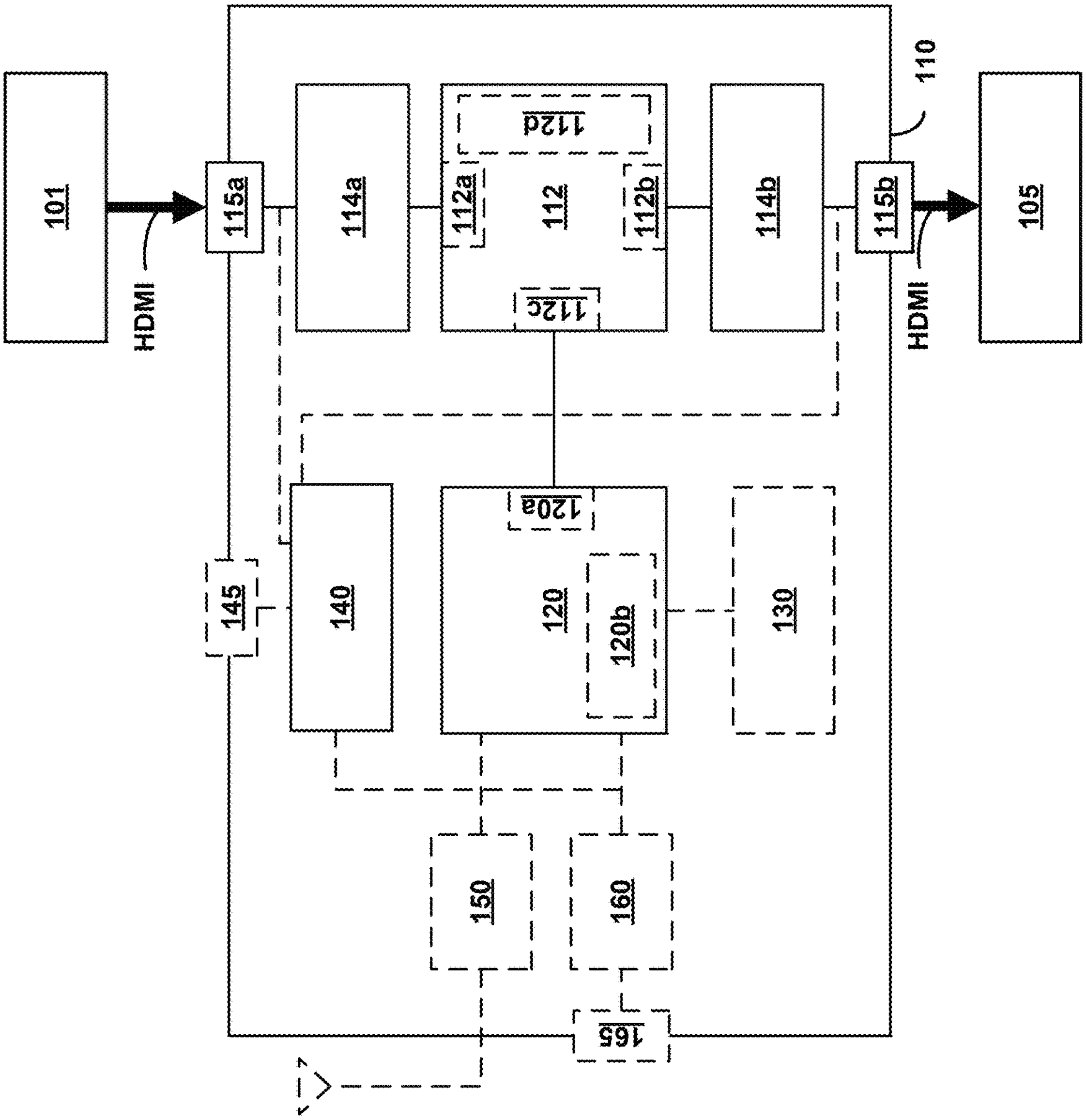
FIG. 1 illustrates aspects of an example system.

Examples of methods and systems are described herein. It should be understood that the words “exemplary,” “example,” and “illustrative,” are used herein to mean “serving as an example, instance, or illustration.” Any embodiment or feature described herein as “exemplary,” “example,” or “illustrative,” is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

It should be understood that the below embodiments, and other embodiments described herein, are provided for explanatory purposes, and are not intended to be limiting.

I. OVERVIEW

It is desirable in many applications to be able to present visual information, including but not limited to text, symbols, images, or other content, via a large number of televisions, monitors, or other displays simultaneously or near-simultaneously. For example, it could be beneficial to be able to provide visual announcements via all or substantially all of the televisions, screens, or other public displays on a hospital, university, school, or other building, campus, or other facility or set of facilities. Such announcements could provide alerts related to emergency conditions or other public safety events (e.g., an impending tornado or other dangerous weather condition), reminders of scheduled events (e.g., a shift change, a closing time, a deadline to make a filing, register, or perform some other action), provide updated information (e.g., a schedule change, a change in a price of a good or service, a changed location of a meeting or other event, a location or status of a parade or other ongoing event), or provide some other visual information in a widespread manner such that a significant number of people on a campus or other facility.

Such facility-wide multi-screen announcements could be implemented by configuring each screen on a facility to be able to communicate with a central server or other system to receive announcement data and to natively inject a visual representation of such announcements into their respective displays. However, such a scenario requires all of the displays to have such capabilities, which can be difficult to accomplish, especially for large displays and/or displays that have been specially adapted to particular applications at a facility. Such a scenario also implicates increased complexity to configure a variety of different displays, as well as complicating the process of upgrading or replacing displays. Additionally, such a scenario can lead to significant security exposure, as the various displays may have different security capabilities and thus may exhibit differing degrees of susceptibility o hacking or other unwanted behavior.

Alternatively, an "announcement appliance" that is capable of communicating with a central server or other source of announcement data, and that is also capable of injecting a visual representation of such announcement information into an HDMI or other video stream, could be added inline with the video feed to each display at a facility. However, in order to arbitrarily modify a video stream to insert announcement data in substantially real time, such an announcement appliance many unacceptably increase the cost (in parts, licensing, etc.), size, power budget, or other constraints imposed on the system, especially in examples wherein the video stream is high-resolution, high frame rate, or otherwise high bitrate (e.g., a 4K HDMI stream at 120 Hz). Such high computational costs can also be associated with high power requirements. Alternatively, such an announcement appliance could have significantly lower computational power (and associated power costs) by 'blanking' an incoming video stream and replacing it with a lower-resolution and/or lower-framerate stream that indicates the announcement information; however, such an embodiment results in the incoming video stream being completely interrupted in order to provide an announcement.

The embodiments described herein overcome these shortcomings by passing video streams through using video stream processors that are specifically adapted to pass through video streams while overlaying thereon, in a limited manner, symbols, images, or other visual overlays from a memory of the video stream processor. Such a video stream processor could accomplish the task of overlaying a limited set of text, symbols, or other image data from respective locations within a local memory onto respective locations of a video stream using a combination of shift registers, counters, digital comparators, digital switches, or other logic components such that the video stream processor accomplishes the insertion of the overlay using significantly less power (e.g., less than 3.3 watts for a 12 GBPS fixed rate link video stream, or less than 3.0 watts for a 10 GBPS fixed rate link video stream) or other computational resources (e.g., thermal budget, area of packaged or unpackaged semiconductor die) for a given stream resolution, frame rate, or bitrate than, e.g., using a graphics processor unit, field programmable gate array, or other type of processor to accomplish such an overlay.

Such a video stream processor could be limited with respect to the number of different letters, symbols, images, or other visual objects that can be overlaid on a video stream, the size (e.g., number of pixels) of such visual objects, and/or with respect to the manner in which such an overlay can be specified (e.g., a total number of such overlays, a degree of control over the transparency of such an overlay, etc.) in order to reduce the complexity, internal bus clock rate, internal memory size, internal bus width, power, or other computational costs of fabricating or operating the video stream processor. For example, an external bus (e.g., an SPI bus) used to transmit the visual objects into the video stream processor and/or to specify the location and identity of visual objects of an overlay could have a limited maximum clock rate.

Such a limited video stream processor may lack the capacity to generate the structure of a video overlay (e.g., to translate a commanded announcement into a pattern of locations and identities of visual objects to overlay onto a video stream), to generate or modify the content of the visual objects, to communicate with a server or other source of announcement data, or to perform other operations of an announcement appliance as described herein. Accordingly, such an announcement appliance can include a separate controller (e.g., a microprocessor that includes one or more processors and/or peripherals) to perform such tasks as well as loading visual object data into the video stream controller and sending commands to the video stream controller to cause the video stream controller to provide overlays onto a video stream to indicate announcements received by the announcement appliance. To account for the slow maximum speed of an input of the video stream processor, such a controller could act, during an initial startup period, to load information defining the visual objects into the internal memory of the video stream processor via the input. The controller could subsequently transmit, via the input, commands to cause the video stream processor to overlay, onto a video stream, various announcement-related overlays composed of the visual objects stored in the internal memory of the video stream processor.

Such a controller/video stream processor can provide additional benefits with respect to total power use by the announcement appliance. The video stream processor can be operated in an 'always on' fashion to allow video streams (e.g., uncompressed video streams) to be passed through the announcement appliance (e.g., without performing compression, decompression, or other significant computations on the stream beyond applying an overlay thereto). Meanwhile, the controller can be operated in different power states, including a 'sleep' or other low-power state when not transmitting commands to the video stream processor, transmitting video object data to the video stream processor, communicating with a server or other remote system to obtain announcement data, or performing some other operations. In this way, the total power consumption of the announcement appliance can be reduced while still allowing the announcement applicant to continuously pass through video streams without interruption.

The controller of the announcement appliance can periodically exit the sleep or other low-power state in order to communicate with a server to obtain information about any new announcements (e.g., by operating a WiFi or other wired or wireless communications interface), to generate an overlay based on any such announcement(s), to transmit commands to implement such an overlay to the video stream processor, and then to re-enter the sleep state. Additionally or alternatively, an Ethernet interface, WiFi radio, or other communications interface of the announcement appliance (e.g., of a peripheral of the controller) could operate in a low-power mode that is capable of exiting the low power mode (and/or of triggering the controller to exit a low-power mode) in response to receiving an announcement from a central server or other remote system, allowing the controller and communications interface to generally operate in the low-power (e.g., sleep) mode except when performing actions related to the overlay of an announcement onto the video stream that is passing through the announcement appliance.

FIG. 1 illustrates an example system 110 (e.g., an announcement appliance as described herein) that includes a video stream processor 112 and a controller 120. The video stream processor 112 and a controller 120 are configured to operate together to receive announcements from a remote system (e.g., a server) and to insert, onto a video stream (e.g., an HDMI stream) received via a video input connector 115*a*, overlay indicative of the announcements and to output the overlaid video stream via a video output connector 115*b*.

The video stream processor 112 includes a first video interface 112*a*, a second video interface 112*b*, a communications interface 112*c* (e.g., an SPI interface, an I2C interface, a UART, or some other variety of serial communications interface), and an internal memory 112*d*. The first video interface 112*a* is communicatively coupled to a video input connector 115*a* via an optional video transceiver 114*a* (e.g., an HDMI video signal transceiver) that is configured to provide a compatible electrical interface with other devices' HDMI outputs (e.g., a video source 101) or other video output signals. The second video interface 112*b* is communicatively coupled to a video output connector 115*b* via an optional video transceiver 114*b* (e.g., an HDMI video signal transceiver) that is configured to provide a compatible electrical interface with other devices' HDMI inputs (e.g., a video sink 105) or other video input signals. Alternatively, such functionality could be provided natively by the video stream processor 112 (e.g., one or more HDMI transceivers could be implemented as part of the video stream processor 112).

The video stream processor 112 is configured to receive an input HDMI or other video stream (e.g., a 4K, HD, or other resolution video stream, a 120 Hz, 60H, or other frame rate video stream) via the first video interface 112*a*, to apply an overlay thereon, and to transmit an output video stream, which is the input stream with the overlay applied thereon, via the second video interface 112*b*. The video stream processor 112 is configured to apply the overlay by overlaying visual objects (e.g., letters, symbols, or other image data) that are stored in the internal memory 112*d* at respective commanded locations within the input video stream. The video stream processor 112 is also configured to receive, via a communications interface 112*c* from the controller 120, indications of the visual objects and commands (e.g., commands to write input data applying specified visual objects in the memory 112*d* to respective locations within the video stream).

The controller 120 could include one or more processors and may include a number of peripherals (e.g., an output port 120*a* configured as an SPI peripheral, I2C peripheral, UART, or other serial or otherwise configured communications link to transmit information to the video stream processor 112). The controller can include an internal memory 120*b* that has stored thereon a plurality of letters, symbols, images, or other visual objects that the controller 120 can transmit to the video stream processor 112 such that the video stream processor 112 can later, in response to commands transmitted from the controller, overlay such visual objects onto a video stream in order to provide visual indications of announcements or other information received by the controller 120. Additionally or alternatively, the controller 120 could be in communication with an external memory 130 having stored thereon such visual objects. Additionally or alternatively, the video stream processor 112 could receive visual object data from another source, e.g., from an external memory (not shown) that is also used to load firmware, security key(s), and/or other information into the video stream controller 112 upon startup.

The controller 120 is configured to transmit indications of the visual objects to the video stream processor 112, via the output port 120*a*, so that the video stream processor 112 can store records of the visual objects in the internal memory 112*d* for later overlay onto the video stream passing through the video stream processor 112. This can include transmitting such indications once (e.g., as part of a start-up procedure for the system 110 each time power is applied thereto) or periodically or according to some other schedule. For example, the internal memory 112*d* of the video stream processor 112 could be limited such that, to effect different announcements, the controller 120 transmits corresponding sets of one or more visual objects to the video stream processor 112 prior to transmitting commands to overlay respective visual objects of the respective different sets of visual objects.

The controller 120 is also configured to transmit, via the output port 120*a*, commands to the video stream processor 112 to cause the video stream processor 112 to overlay sets of visual objects stored in the memory 112*d* onto a video stream in order to effect visual indications of various announcements. This can include transmitting a set of identities of visual objects (e.g., as addresses or other locations within the memory 112*d*) and corresponding locations within the video stream to overlay the identified visual objects. This can also include transmitting sizes (e.g., scale factors), transparency levels, colors, flash rates, or other information about how to overlay the identified visual objects onto the video stream individually or in common (e.g., transmitting a single transparency value at which to overlay all of the identified visual objects onto the video stream).

The controller 120 is also configured to communicate with one or more remote systems (e.g., an announcement server) in order to receive information about announcements to indicate as overlays on the video stream and then to transmit appropriate commands to the video stream processor 112 to cause such overlays to be applied to the video stream. This can include communicating with the remote system(s) via a wireless communication interface 150 (e.g., a WiFi radio, a Bluetooth radio, a ZigBee radio, an emergency services radio) and/or a wired communication interface 160 (e.g., an Ethernet PHY chip) and connector 165 (e.g., an Ethernet connector) that are configured to provide a compatible electrical interface with other devices' network outputs (e.g., Ethernet connections, coaxial cable connections, optical fiber connections) or other network signals. Such communications interfaces are illustrated in FIG. 1 as being separate from the controller 120, but some or all of the functionally of such interfaces could be provided natively by the controller 120 (e.g., level shifters, differential amplifiers, filter, or other elements of an Ethernet-compatible PHY layer could be implemented as part of the controller 120, while magnetics or other elements could be implemented by additional components, e.g., by magnetics integrated into the network connector 165).

Once the controller 120 has received information indicative that an announcement should be indicated overlaid on the video stream, the controller can then generate and transmit an appropriate set of commands to the video stream processor 112 to cause such overlays to be applied to the video stream. This can include determining that one of an enumerated set of announcements should be indicated and then transmitting, to the video stream processor 112, a corresponding set of commands implementing the set of visual object overlays to indicate the appropriate announcement. Additionally or alternatively, the controller 120 could render the announcement into a corresponding set of visual object overlays (e.g., a string of text to represent the type of the announcement as well as static, location-specific information) and could then transmit a set of commands to cause the video stream processor 112 to overlay the rendered set of visual objects.

The system 110 includes a power supply 140 to provide power to the controller 120, video stream processor 112, and other elements of the system 110. This could include receiving power via an external connector 145 (e.g., a USB connector), via one of the video connectors 115*a*, 115*b*, via the wired network connector 165 (e.g., via power-over-Ethernet), and/or via some other source.

The controller 120 and video stream processor 112 could be configured in a variety of ways (e.g., could be implemented as a variety of different systems-on-chip ("SoC"), specialty ASICs, or other types of digital device or combinations of digital devices using a variety of different semiconductor substrates) to provide the functionality described herein. Such devices could include general-purpose controllers, CPUs, GPUs, TPUs, ASICs, FPGAs, or otherwise-configured elements. Such devices could be formed from single integrated circuits and/or from modules of multiple integrated circuits packaged together. The video stream processor 112 could be an Analog Devices ADV7671A, ADV8002, or ADV7625 HDMI transceiver chip with on-screen display overlay functionality. The video stream processor 112 could include HDCP or other functionality to facility pass-through of HDMI or other video streams with minimal or no configuration of the video source 101 and/or sink 105. In some examples, the controller 120 could have incorporated therein an "IP core" configured to manage a IP link between the system 110 and a remote source of announcements. Alternatively, one or more elements external to the controller 120 could implement some or all of the IP link. In some examples, the controller 120 and/or video stream processor 112 could include additional controllers (e.g., 140) and/or external memories (e.g., 130) configured to, e.g., manage boot-up of the units (e.g., initializing and/or loading firmwares, visual object data, security keys (e.g., HDCP keys), or other programming into the controller 120 and/or video stream processor 112, initializing the other elements of those devices), perform power management of the system 110, implement status indicators or other low-level operations for the system 110, provide brownout detection and restart-on-failure functionality, or to provide some other functionality for the system 110.

The controller 120 could be configured to pair with a remote server or other source of announcements via variety of methods. In some examples, such pairing could be factory-set, with particular systems 110 (and their corresponding controllers 120) pre-paired with particular announcement servers (e.g., at pre-specified IP addresses, at pre-specified URLs, at pre-specified identifiers at an RSS server or other source of 'announcement' type data, using pre-specified security keys, decryption keys, or other login or security credentials), and with both units capable of performing pings or other network operations sufficient to establish an IP link there between. In some examples, configuration information (e.g., unit IP addresses, gateway addresses, pairing with opposite units, network credentials) could be input into the system 110 using a hardware serial connection and/or USB connection (e.g., using a serial terminal emulator over a USB connection). In some examples, configuration information could be provided on physical media (e.g., removable SD storage) that is loaded into the system 110.

Note that, while HDMI is used herein as an example of a high-resolution digital video interconnect standard, it is only intended as a non-limiting example of such a digital video interconnect standard. Wherever HDMI is referenced herein, one of skill in the art will appreciate that alternative digital video interconnect standards, current and to-be-developed, could be substituted without exiting the scope of the subject matter contemplated herein. Further, while the streaming of HDMI or related signals, and the overlay of information thereon, are described in relation only to their video content, it will be appreciated by one of skill in the art that such "video" signals may include one or more audio channels associated therewith as described in the HDMI standard or similar audiovisual interconnect standards.

These as well as other aspects, advantages, and alternatives will become apparent to those of ordinary skill in the art by reading the above detailed description with reference where appropriate to the accompanying drawings. Further, it should be understood that the description provided in this summary section and elsewhere in this document is intended to illustrate the claimed subject matter by way of example and not by way of limitation.

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

II. EXAMPLE METHODS

Figure 2:
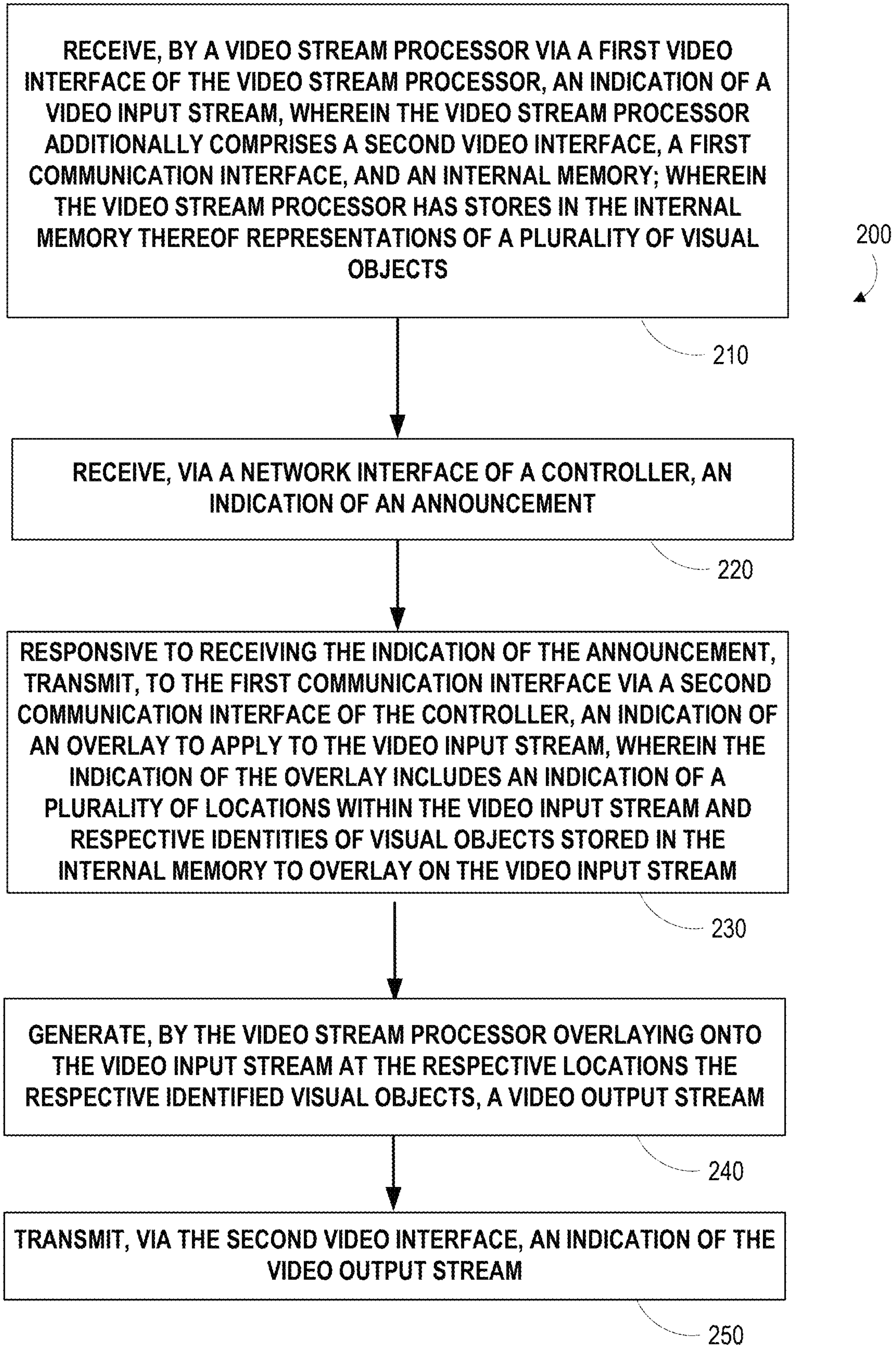
FIG. 2 illustrates a flowchart of an example method.

FIG. 2 is a flowchart of an example computer-implemented method 200. The method 200 includes receiving, by a video stream processor via a first video interface of the video stream processor, an indication of a video input stream, wherein the video stream processor additionally comprises a second video interface, a first communication interface, and an internal memory; wherein the video stream processor has stores in the internal memory thereof representations of a plurality of visual objects (210). The method 200 additionally includes receiving, via a network interface of a controller, an indication of an announcement (220). The method 200 additionally includes, responsive to receiving the indication of the announcement, transmitting, to the first communication interface via a second communication interface of the controller, an indication of an overlay to apply to the video input stream, wherein the indication of the overlay includes an indication of a plurality of locations within the video input stream and respective identities of visual objects stored in the internal memory to overlay on the video input stream (230). The method 200 additionally includes generating, by the video stream processor overlaying onto the video input stream at the respective locations the respective identified visual objects, a video output stream (240). The method 200 additionally includes transmitting, via the second video interface, an indication of the video output stream (250). The method 200 could include additional or alternative features.

III. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A system comprising:

a video input connector;

a video output connector;

a video stream processor, wherein the video stream processor comprises a first video interface, a second video interface, a first communication interface, and an internal memory, wherein the video stream processor is configured to store representations of a plurality of visual objects in the internal memory, and wherein the video stream processor is configured to:

receive, via the first video interface, an indication of a video input stream that is input into the system via the video input connector;

receive, via the first communication interface, an indication of an overlay to apply to the video input stream, wherein the indication of the overlay includes an indication of a plurality of locations within the video input stream and respective identities of visual objects stored in the internal memory to overlay on the video input stream;

generate, by overlaying onto the video input stream at the respective locations the respective identified visual objects, a video output stream; and transmit, via the second video interface, an indication of the video output stream from the system via the video output connector; and a controller comprising one or more processors, wherein the controller includes a second communication interface and a network interface, and wherein the controller is configured to:

receive, via the network interface, an indication of an announcement; and responsive to receiving the indication of the announcement, transmit, to the first communication interface via the second communication interface, the indication of the overlay.

2. The system of claim 1, wherein the video input stream and video output stream are compatible with the High-Definition Multimedia Interface (HDMI) standard.

3. The system of claim 2, additionally comprising an HDMI transceiver, wherein the first video interface of the video stream processor is communicatively coupled to the video input connector via the HDMI transceiver.

4. The system of claim 1, wherein the input video stream includes at least one audio information channel.

5. The system of claim 1, wherein the video stream processor includes at least one of an ADV7671A, ADV8002, or ADV7625 HDMI transceiver chip.

6. The system of claim 1, wherein the video input stream has a resolution greater than or equal to 4K.

7. The system of claim 1, wherein the controller is additionally configured to transmit, to the first communication interface via the second communication interface, representations of the plurality of visual objects for storage in the internal memory.

8. The system of claim 7, wherein the controller transmitting the representations of the plurality of visual objects comprises the controller accessing stored representations of the plurality of visual objects in an external memory and then transmitting the representations via the second communication interface.

9. The system of claim 7, wherein the controller is additionally configured to:

after transmitting the representations of the plurality of visual objects, enter a low-power state;

exit the low-power state to receive the indication of the announcement; and after transmitting the indication of the overlay, enter the low-power state.

10. The system of claim 1, wherein the video stream processor is additionally configured to access stored representations of the plurality of visual objects in an external memory and then store the representations in the internal memory.

11. The system of claim 1, wherein the controller is additionally configured to:

exit a low-power state to receive the indication of the announcement; and after transmitting the indication of the overlay, enter the low-power state.

12. The system of claim 11, wherein the controller exiting the low-power state to receive the indication of the announcement comprises the network interface receiving at least a portion of the indication of the announcement and responsively causing the controller to exit the low-power state.

13. The system of claim 1, wherein the controller receiving the indication of the announcement comprises:

transmitting, via the network interface, a request to a remote system; and responsively receiving, from the remote system via the network interface, the indication of the announcement.

14. The system of claim 1, wherein receiving the indication of the announcement comprises receiving an indication of a selected announcement from an enumerated set of possible announcements, and wherein transmitting the indication of the overlay comprises:

accessing, from a memory of the controller, a set of locations within the video input stream and respective identities of visual objects stored in the internal memory that corresponds to the selected announcement; and transmitting, to the first communication interface via the second communication interface, indications of the accessed set of locations and respective identities, thereby transmitting an indication of the overlay.

15. The system of claim 1, wherein the input video stream and output video stream are uncompressed video streams, and wherein the video stream processor does not decompress the input video or perform compression to generate the output video stream.

16. A method comprising:

receiving, by a video stream processor via a first video interface of the video stream processor, an indication of a video input stream, wherein the video stream processor additionally comprises a second video interface, a first communication interface, and an internal memory; wherein the video stream processor has stores in the internal memory thereof representations of a plurality of visual objects;

receiving, via a network interface of a controller, an indication of an announcement;

responsive to receiving the indication of the announcement, transmitting, to the first communication interface via a second communication interface of the controller, an indication of an overlay to apply to the video input stream, wherein the indication of the overlay includes an indication of a plurality of locations within the video input stream and respective identities of visual objects stored in the internal memory to overlay on the video input stream;

generating, by the video stream processor overlaying onto the video input stream at the respective locations the respective identified visual objects, a video output stream; and transmitting, via the second video interface, an indication of the video output stream.

17. The method of claim 16, further comprising:

transmitting, to the first communication interface by the controller via the second communication interface, representations of the plurality of visual objects for storage in the internal memory.

18. The method of claim 17, wherein transmitting the representations of the plurality of visual objects comprises accessing, by the controller, stored representations of the plurality of visual objects in an external memory and then transmitting the representations via the second communication interface.

19. The method of claim 17, further comprising, by the controller:

after transmitting the representations of the plurality of visual objects, entering a low-power state;

exiting the low-power state to receive the indication of the announcement; and after transmitting the indication of the overlay, entering the low-power state.

20. The method of claim 16, further comprising, by the video stream processor:

accessing stored representations of the plurality of visual objects in an external memory and then storing the representations in the internal memory.

* * * * *